United States Patent
Sakamoto

(10) Patent No.: US 9,898,505 B2
(45) Date of Patent: Feb. 20, 2018

(54) METHOD, APPARATUS AND PROGRAM FOR TRANSFORMING INTO BINARY DATA

(71) Applicant: NEC Corporation, Tokyo (JP)

(72) Inventor: Shizuo Sakamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 378 days.

(21) Appl. No.: 14/431,824

(22) PCT Filed: Sep. 26, 2013

(86) PCT No.: PCT/JP2013/076021
§ 371 (c)(1),
(2) Date: Mar. 27, 2015

(87) PCT Pub. No.: WO2014/050952
PCT Pub. Date: Apr. 3, 2014

(65) Prior Publication Data
US 2015/0248458 A1 Sep. 3, 2015

(30) Foreign Application Priority Data
Sep. 27, 2012 (JP) .................................. 2012-213419

(51) Int. Cl.
*G06F 17/30* (2006.01)
*G06F 21/60* (2013.01)
(Continued)

(52) U.S. Cl.
CPC .. *G06F 17/30448* (2013.01); *G06F 17/30097* (2013.01); *G06F 21/60* (2013.01);
(Continued)

(58) Field of Classification Search
None
See application file for complete search history.

(56) References Cited

U.S. PATENT DOCUMENTS

| 8,510,311 B2 | 8/2013 | Shibata et al. |
| 8,543,598 B2 | 9/2013 | Udupa et al. |

(Continued)

FOREIGN PATENT DOCUMENTS

| EP | 2 498 191 A1 | 9/2012 |
| JP | 2009-20769 | 1/2009 |

(Continued)

OTHER PUBLICATIONS

Extended European Search Report dated May 31, 2016 by the European Patent Office in counterpart European Patent Application No. 13840759.8.
(Continued)

*Primary Examiner* — Syed Hasan
(74) *Attorney, Agent, or Firm* — Finnegan, Henderson, Farabow, Garrett & Dunner, L.L.P.

(57) ABSTRACT

Data set is transformed into a plurality of items of K-bit-long binary data, using, as each of K number hash functions that transforms the data into a binary representation based on a value of projection of the data point on a projection vector. A hash function parameter optimization section finds a hash value, using a continuous valued hash function including, as a variable, the projection of data point on a projection vector, and stores continuous valued learning data for binary transformation, and derives optimized parameter(s) of the hash function that minimizes a cost function, defined based on a distance of the data point and on a distance of the learning data for binary transformation.

20 Claims, 11 Drawing Sheets

(51) Int. Cl.
*G06N 5/02* (2006.01)
*H04L 9/32* (2006.01)

(52) U.S. Cl.
CPC ............. *G06N 5/02* (2013.01); *H04L 9/3231* (2013.01); *H04L 9/3236* (2013.01)

(56) References Cited

U.S. PATENT DOCUMENTS

| | | |
|---|---|---|
| 8,630,482 B2 | 1/2014 | Anbai et al. |
| 2009/0019044 A1 | 1/2009 | Shibata et al. |
| 2009/0307184 A1* | 12/2009 | Inouye ............... G06F 17/30333 |
| 2010/0077278 A1* | 3/2010 | Wang .................. G06K 9/00885 714/752 |
| 2011/0213784 A1 | 9/2011 | Udupa et al. |
| 2012/0168506 A1* | 7/2012 | Ruehrmair ............... G06F 21/73 235/454 |
| 2012/0219212 A1 | 8/2012 | Anbai et al. |
| 2015/0169644 A1* | 6/2015 | Gong ................ G06F 17/30277 707/769 |
| 2015/0169682 A1* | 6/2015 | Toshev .............. G06F 17/30949 707/713 |
| 2015/0248390 A1* | 9/2015 | Gormish ............... G06F 17/241 715/233 |

FOREIGN PATENT DOCUMENTS

| | | |
|---|---|---|
| WO | WO 2011/109251 A2 | 9/2011 |
| WO | WO 2012/077818 A1 | 6/2012 |

OTHER PUBLICATIONS

Y. Weiss et al., "Spectral Hashing", NIPS, pp. 1-8, 2008.
J. Wang et al., "Sequential Projection Learning for Hashing with Compact Codes", Proc. of the 27$^{th}$ ICML, 2010.
P. Tuyls et al., "Practical Biometric Authentication with Template Protection", Proceedings of AVBPA, Lecture Notes in Computer Science, vol. 3546, Springer Verlag, pp. 436-446, 2005.
R. Salakhutdinov et al., "Semantic hashing", International Journal of Approximate Reasoning, vol. 50, No. 7, pp. 969-978, 2009.
M. Raginsky et al., "Locality-Sensitive Binary Codes from Shift-Invariant Kernels", NIPS, vol. 22, 2010.
M. Norouzi et al., "Minimal Loss Hashing for Compact Binary Codes", Proceedings of the 28$^{th}$ International Conference on Machine Learning, pp. 1-8, 2011.
W. Liu et al., "Supervised Hashing with Kernels", Computer Vision and Pattern Recognition (CVPR), IEEE Conference on Online, pp. 2074-2081, 2012.
B. Kulis et al., "Learning to Hash with Binary Reconstructive Embeddings", Advances in Neural Information Processing Systems 22, pp. 1-9, 2009.
M. Datar et al., "Locality-Sensitive Hashing Scheme Based on p-Stable Distributions", Proc. Symposium on Computational Geometry, pp. 253-262, 2004.
International Search Report and Written Opinion dated Nov. 5, 2013.

* cited by examiner

FIG. 2

RELATED ART

Ex. 179 →

| MSB | | | | | | | LSB |
|---|---|---|---|---|---|---|---|
| 1 | 0 | 1 | 1 | 0 | 0 | 1 | 1 |
| $2^7$ | $2^6$ | $2^5$ | $2^4$ | $2^3$ | $2^2$ | $2^1$ | $2^0$ |

SINCE BITS ARE DIFFERENT IN WEIGHTS, THE DISTANCE OBTAINED ON COUNTING THE NUMBER OF BIT FLIPS ON XORS DIFFERS APPRECIABLY FROM THE DISTANCE ON AN ORIGINAL NUMERICAL VALUE.

METHOD, APPARATUS AND PROGRAM FOR TRANSFORMING INTO BINARY DATA

CROSS-REFERENCE TO RELATED APPLICATIONS

This application is a National Stage Entry of International Application No. PCT/JP2013/076021, filed Sep. 26, 2013, which is based upon and claims the benefit of the priority of Japanese Patent Application No. 2012-213419 filed in Japan on Sep. 27, 2012. The entire contents of the above-referenced applications are expressly incorporated herein by reference.

TECHNICAL FIELD

This invention relates to a method, an apparatus and a program for transforming into binary data.

BACKGROUND

As a technique that searches gigantic data, such as millions or billions of data laid open on Web sites, such a technique that transforms features of data into short binary templates, globally termed a "binary hashing", has been developed briskly. Data to be retrieved is transformed into fixed-length binary data (binary templates), and a bit logic operation, such as an exclusive OR (XOR), is used to compute a distance between two items of fixed-length binary data (binary templates). The bit logic operation such as XOR, is fast. Thus, if the data length of the fixed-length binary data (binary templates) could be reduced sufficiently, even in retrieving in a large-scale database, high speed retrieval might be accomplished using the data loaded on a physical memory of a computer. However, if, in order to compute the distance between two binary templates, such a method that counts the number of times of flips (bit inversions) in the result of an XOR operation is used, the distance computed may be deviated significantly from the distance between the original data.

It is noted that binary hashing maps a data set that is composed by a plurality of (n number of) items of data and represented by points on a D-dimensional space, where D is a predetermined positive integer, $$X=\{\vec{x}_1,\ldots,\vec{x}_n\}\in R^{D\times n} \quad (1)$$

to a Hamming space of binary codes (binary codes) in which near or nearest neighbors on the original space are mapped similarly near or nearest on the Hamming space. That is, the data set is transformed to n number K)-bit-long binary codes (binary data), $$Y=\{\vec{y}_1,\ldots,\vec{y}_n\}\in B^{K\times n} \quad (2)$$

K being a preset positive integer, as the near or nearest neighbor relation by the Euclid distance in the original data set space $R^{D\times n}$ is kept as it is. In the above expressions, a symbol "→" (representing a superscript arrow) denotes a vector. $\vec{x}_i$ (i=1, ..., n) denotes a D-dimensional vector and $\vec{y}_i$ (i=1, ..., n) denotes a K-dimensional vector. Note that, in the equation (1), R denotes a set of entire real numbers, and that, in the equation (2), B denotes a binary code (binary code).

To produce a K-bit binary code, K number hash functions are used. A hash function receives a D-dimensional vector and returns a binary value −1 or 1, as an example.

There are a large variety of hash functions and it is assumed here that the hashing that is based on linear projection. A k'th (k=1, ..., K) hash function $h_k(\vec{x})$ is defined by the following equation (3):

$$h_k(\vec{x})=\mathrm{sgn}(f(\vec{w}_k^T\vec{w}+b_k) \quad (3)$$

In the above equation, sgn( ) is a sign function which returns a sign of an argument, that is, a function in which, if, in the equation (3), an argument f( ) is negative or positive, the sign function returns −1 or +1, respectively. f( ) is a transform function, $\vec{w}_k$ is a projection vector, T is a transpose, $\vec{x}$ is a data point and $b_k$ is a threshold value (offset).

Since $$h_k(\vec{x})\in\{1,-1\}$$

a k'th one of binary hash bits is given by the following expression (4):

$$\frac{(1+h_k(\vec{x}))}{2} \quad (4)$$

That is, the k'th bit of the binary code (k=1, ..., K) is 1, and 0 when the k'th hash function $h_k(\vec{x})$ is +1, and −1, respectively.

As the technique of the binary hashing, there is a series of techniques termed Locality Sensitive Hashing (is abbreviated as "LSH"), see Non-Patent Literature 1 and so forth.

In LSH, an identity function is used as the transform function f( ) of the above equation (1), and $\vec{w}$ is randomly selected from p-stable distributions, while $\vec{b}$ is randomly selected from uniform distributions. LHS does not rely on parameter selection or learning data, so that only short time is needed for parameter determination.

It has been proved that, in LHS, the degree of approximation of the neighbor relation may be improved by increasing the projected bit length K to 128, 512 and so on. That is, the Hamming distance may approach more closely to the Euclidean distance. It has however been pointed out that approximation in LHS is not good in the case wherein the bit length K is not of a larger value, so that sufficient accuracy may not be achieved.

Non-Patent Literature 2 in particular discloses a technique in which, as in LHS, selection of parameters of the hash function does not rely on learning data. In this technique, in which $\vec{w}$ is selected in a similar manner as in LHS, a trigonometric function is used as the transform function f( ). It is said that, by so doing, the accuracy in the approximation has been improved for the bit length K which is not of a larger value.

These days, such a technique in which selection of parameters of the hash function relies on learning data is being developed. The spectral hashing, disclosed in Non-Patent Literature 3, uses a trigonometric function as the transform function f( ). In the spectral hashing, after moving the learning data $\{x_i\}$ so that the centroid thereof coincides with a zero or origin point, a principal axis obtained by processing learning data with principal component analysis (Principal Component Analysis: PCA), with an offset b being set to 0 and with the projection vector of $\vec{w}_k$, is selected. That is, the spectral hashing algorithm may be defined as follows:

After translating in-parallel the data so that an average value thereof is equal to zero, principal components of the data are found using the PCA.

For each of the PCA directions, eigenfunctions (Lpφ=λφ) of Lp (e.g., one-dimensional Laplacian), that is, k number smallest single-dimension analytical eigenfunctions, are calculated with the use of rectangular approximation. For each of the directions, k number smallest eigenvalues are calculated to generate a list of d×k number eigenvalues to find k number smallest eigenvalues A binary code is obtained by using a threshold value of 0 from an output of the analytical eigenfunctions for input of each data.

In the Non-Patent Literature 3, the eigenfunctions $\Phi_k$ and eigenvalue $\lambda_k$ of the one-dimensional Laplacian are given as below:

$$\Phi_k = \sin\left(\frac{\pi}{2} + \frac{k\pi}{b-a}x\right) \text{ and } \lambda_k = 1 - \exp\left(-\frac{\epsilon^2}{2}\left|\frac{k\pi}{b-a}\right|^2\right)$$

While in LHS, the projection vector $\vec{w}$ is randomly generated, in the spectral hashing, it is found based on the principal component analysis (PCA) of data. For this reason, the spectral hashing is said to be higher in accuracy than LHS. However, in the spectral hashing, it is necessary to perform principal component analysis. Thus, if singular value decomposition which is stable, as numerical computation, is used, the computation amount of spectral hashing is on the order of $O(N^2)$ to $O(N^3)$, where N is the number of dimensions of a matrix (number of dimensions of features). Note that $O(N^2)$ to $O(N^3)$ indicates that an algorithm is such a one in which the computation amount is proportional to a square or a triple of the size (N) of an input data set.

It is known in general that a pattern as a subject for recognition forms a relatively compact and complex manifold in a feature space. It has been pointed out that, in such a case, a pattern distribution tends to be concentrated in a subspace spanned by a smaller number of principal component vectors, so that sufficient accuracy may not be achieved.

In an algorithm (Unsupervised Sequential Projection Learning for Hashing, abbreviated as USPLH), disclosed in Non-Patent Literature 4, intended to resolve the problem, f( ) is an identity function, and the learning data are moved so that the centroid thereof coincides with a zero or origin point. An eigenvector is then found and data are projected thereon and subjected to thresholding at 0. A point $r^+$ and a point $r^-$ which are close to 0 (see FIG. 1) are assigned different hash values, even though these data points are close to each other. Learning is made so that a point $r^+$ and a point $R^+$, which are of the same sign and which are respectively closer to and remoter from 0, are assigned the same hash value, and so that a point $r^-$ and a point $R^-$, which are of the same sign and which are respectively closer to and remoter from 0, are assigned the same hash value (see FIG. 1). In USPLH, the parameter $\vec{w}_k$ is learned in accordance with the following algorithm (see Algorithm 2 of the Non-Patent Literature 4).

1. Learning data X and a binary code length (hashing code length) K are entered.
2. Initialize so that $X^0_{MC}=\phi$, $S^0_{MC}=0$
3. Repeat the following 4 to 7 from k=1 to k=K.
4. Compute a corrected covariance matrix:

$$M_k = \Sigma_{i=0}^{k-1} \lambda^{k-i} X i_{MC}^i S_{MC}^i X_{MC}^{i^T} + \eta XX^T$$

5. Extract a first principal component vector (eigenvector) $\vec{e}$ of $M_k$ to set it to $\vec{w}_k$:

$$\vec{w}_k = \vec{e}$$

6. Produce a pseudo label from the projection $\vec{w}_k$. Sample $X^k_{MC}$ and construct $S^k_{MC}$.
7. Compute a residual:

$$X = X - \vec{w}_k \vec{w}_k^T X$$

The following describes a case wherein data points are projected on the one-dimensional axis. It is assumed that, with respect to $$\vec{w}_k^T \vec{x} = 0$$

(boundary of division by the one-dimensional axis), a point lying on the left side of the boundary is $h_k(\vec{x})=-1$ and a point on the right side of the boundary is $h_k(\vec{x})=+1$. Two points ($\vec{x}_i$, $\vec{x}_j$), ($\vec{x}_i \in r^-$, $\vec{x}_j \in r^+$), lying at sites in the left and right regions that are close to the boundary, with the boundary in-between, are assigned different hash bits, even though their projections on the one-dimensional axis are extremely close to each other. For the distances of the projections of $\vec{x}_i$ and $\vec{x}_j$ on the projection vector $$|\vec{w}_k(\vec{x}_i - \vec{x}_j)|$$

being not greater than $\epsilon$, which is a preset positive number, the hash value $h(\vec{x}_i)=-1$ and the hash value $h(\vec{x}_j)=1$. Note that FIG. 1 is equivalent to FIG. 2 of the Non-Patent Literature 4.

On the other hand, two points ($\vec{x}_i$ and $\vec{x}_j$), which are points ($\vec{x}_i \in r^-$ and $\vec{x}_j \in R^-$) or points ($\vec{x}_i \in r^+$ and $\vec{x}_j \in R^+$), with $R^-$ and $R^+$ lying in left and right regions far remote from the boundary, with the boundary in-between, are assigned the same hash bits even though their projections are far remote from each other $$|\vec{w}_k(\vec{x}_i - \vec{x}_j)| \geq \xi$$

where $\xi$ is a preset positive number). That is, the product of the hash values ($\vec{x}_i$) and ($\vec{x}_j$) is equal to 1.

To correct such boundary error, USPLH introduces a neighbor pair set M and a non-neighbor pair set C. The data point pair ($\vec{x}_i$, $\vec{x}_j$), included in the set M, are data points within $r^-$ and $r^+$ which should be assigned the same hash bits. The data point pair ($\vec{x}_i$, $\vec{x}_j$), included in the set C, are data points within $R^-$ and within $r^-$ or data points within $R^+$ and within $r^+$, and should be assigned respective different hash bits. The following neighbor pair set M and non-neighbor pair set C are introduced:

$$M = \{(\vec{x}_i, \vec{x}_j)\} : h(\vec{x}_i) \cdot h(\vec{x}_j) = -1, |\vec{w}_k^T(\vec{x}_i - \vec{x}_j)| \leq \epsilon$$

$$C = \{(\vec{x}_i, \vec{x}_j)\} : h(\vec{x}_i) \cdot h(\vec{x}_j) = 1, |\vec{w}_k^T(\vec{x}_i - \vec{x}_j)| \leq \xi$$

where $\epsilon < \xi$.

A preset number of point pairs are sampled from each of the neighbor pair set M and the non-neighbor pair set C. $X_{MC}$ contains all points separated at least by one sample point pair. Using labeled pairs and $X_{MC}$ (m-number sampling), a pairwise label matrix $S_{MC}$ is found.

$$S \in R^{m \times m}$$

$$S_{i,j} = 1 ((\vec{x}_i, \vec{x}_j) \in M)$$

$$S_{i,j} = -1 ((\vec{x}_i, \vec{x}_j) \in C) \text{ and}$$

$$S_{i,j} = 0 \text{ if otherwise.}$$

That is,
for a point pair of ($\vec{x}_i, \vec{x}_j) \in M$, $S^k_{MC}=1$, and
for a point pair of ($\vec{x}_i, \vec{x}_j) \in C$, $S^k_{MC}=-1$
are assigned.

In the next iteration, the pseudo labels are made so that a point pair in the set M is assigned with the same hash value and a point pair in the set C is assigned with different hash values. By so doing, the error made by the previous hash function is corrected.

Each hash functions $h_k()$ generates a pseudo label set $X^k_{MC}$ and the corresponding label matrix $S^k_{MC}$. The new label information is used to adjust the data covariance matrix in each iteration of sequential learning. To learn a new projection vector $\vec{w}$, all the pairwise label matrices since the beginning are used but their contribution decreases exponentially by a factor λ at each iteration.

The principal component direction corrected by a residual error is found. However, since there exist no pseudo labels at the beginning, the first vector $\vec{w}_i$ is the principal direction of the data. Each hash function is learned to satisfy the pseudo labels iteratively by adjusting the data covariance matrix. It is seen that the above mentioned USPLH algorithm represents a technique that finds the principal component directions corrected by the residual error.

Patent Literature 1 discloses, for a near or nearest search method that uses a hash function, a technique which searches the nearest pattern with a low error ratio at a high speed. In this technique, a set of learning patterns is assumed to be a normal distribution (Gaussian distribution), and a cumulative probability distribution on an arbitrary axis on the learning pattern is approximated by a sigmoid function $(Psd=1/\{1-\exp(-(x-\mu)/a)\}$, where μ is an average and a is a standard deviation, using e.g., the least square approximation. A plurality of hash functions partitioning the values of the probability at a constant interval based on cumulative probability distribution is defined. A sum of subsets in a spatial region (packet), obtained by partitioning by the hash functions, is found from output values of the hash functions that input an unknown pattern. The nearest pattern is searched from the resulting sum of sets.

Non-Patent Literature 5 discloses a system of biometric authentication in which a template for authentication, present in a database, is masked (by taking bitwise exclusive OR (XOR)) with a random BCH (Bose-Chaudhuri-Hocquenghem) code word C to protect the biometric information. Reference is made to an Example stated hereinbelow. The above mentioned binary hashing technique may be applied for this system because the template for authentication needs to be fixed-length binary data.

[Patent Literature 1] JP2009-20769A
[Non-Patent Literature 1] Mayur Datar, Nicole Immorlica, Piotr Indyk and Vahab S. Mirrokni, "Locality-Sensitive Hashing Scheme Based on p-Stable Distribution", Proc. Symposium on Computational Geometry, pp. 253-262, 2004
[Non-Patent Literature 2] Maxim Raginsky and Svetlana Lazebnik, "Locality-Sensitive Binary Codes from Shift-Invariant Kernels", NIPS Vol. 22, 2010
[Non-Patent Literature 3] Yair Weiss, Antonio Torralba and Rob Fergus, "Spectral Hashing", NIPS 2008
[Non-Patent Literature 4] Jun Wang, Sanjib Kumar and Shih-Fu Chang, "Sequential Projection Learning for Hashing with Compact Codes", Proc. of the $27^{th}$ ICML 2010
[Non-Patent Literature 5] Pim Tuyls, Anton H. M. Akkermans, Tom A. M. Kavenaar, Geert-Jan Schrijen, Asker M. Basen and Raymond N. J. Veldhuis, "Practical Biometric Authentication with Template Protection", Proceedings of AVBPA 2005, Lecture Notes in Computer Science, Vol. 3546, Springer Verlag, pp. 436-446, (2005)

SUMMARY

The following describes analysis of related technologies. In the following, binary representation in a feature space in particular will be discussed.

In a technique that does not rely on learning data, such as LSH, mentioned above, sufficient approximation accuracy may not be realized unless the bit length is sufficiently long. Therefore, such technique is not efficient in point of, for example, the storage capacity and operation unit (bit lengths) needed.

The learning type is reviewed. Here, the bit expression of a numerical figure is considered. FIG. 2 shows an example in which a numerical value 179 in the char (character type) is expressed in 8 bits. It is assumed that the number of bits that become "1" following exclusive OR (XOR) operations with other numerical figures (bit strings) represents a distance. In this case, even if just one bit is different, there is a difference in weight between the most significant bit (MSB) side and the least significant bit (LSB) side. If, out of the eight bits for one byte, it is the MSB that differs, the weight is 128, whereas, if the differing bit is the LSB, the weight is 1. That is, even if it is only one bit that differs, the difference in the weight of the bit position gives rise to a marked difference in a value obtained. It is therefore desirable that respective bits are of the weight which is as uniform as possible.

The above mentioned spectral hashing is such a technique that applies a plurality of trigonometric functions to the principal component directions. FIG. 3 schematically shows the spectral hashing, and shows zeroth to third eigenvectors. The spectral hashing features setting of positive and negative regions with principal component directions of PCA, and step-wise change in the size of the regions. It is seen that this is essentially the same as the numerical value-bit expression shown in FIG. 2.

In the spectral hashing, desired approximation accuracy may not be realized if the patterns are concentrated in the low dimensional space. This evidently is due to the fact the spectral hashing fails to solve the problem inherent in the commonly used bit expression of a numerical value as presented in FIG. 2.

In the above mentioned USPLH algorithm, correction is made by the residual error. However, since the USPLH is the method directed to extraction for the orthogonal coordinate system, its approximation accuracy possibly cannot be improved beyond a certain limit value. FIG. 4 shows eigenvectors in the USPLH algorithm. It is seen that, by expressing (encoding) a numerical figure by a step function, as in FIG. 4, the weights of the respective bits may be equated so that the distance by the exclusive OR (XOR) is proportional to the distance on the feature space.

It is thus seen that, with USPLH, the approximation accuracy cannot be improved beyond a certain limit value, even if simply the direction of the axis of projection (projection vector) of features is optimized, such that it is necessary to correct the offset simultaneously.

That is, granting that the learning type is effective, the learning type, because of binarization by subjecting data to thresholding at an origin in the linear subspace, thus the accuracy or the like has a limitation.

Accordingly, it is an object of the present invention to provide a method, an apparatus, a system and a program for transforming into binary data, according to which it is possible to improve accuracy with a computation amount suppressed from increasing.

In accordance with one aspect of the present invention, there is provided an apparatus transforming data into binary code, comprising a hash function parameter optimization section that optimizes one or more parameters of a hash function, the hash function parameter optimization section receiving, from a memory, a data set composed of a plurality of items of data each represented by a data point on a space of a preset number of dimensions and transforming the data set into a plurality of K-bit-long binary codes, using a hash function having the one or more parameters optimized, as each of K number hash functions that transforms the data into a binary representation, based on a value of projection of the data point on a projection vector, K being a preset positive integer, wherein the hash function parameter optimization section includes:

a hash function operation unit that, using, as the hash function, a continuous valued hash function including, as a variable, a projection of the data point on the projection vector, finds a hash value, and outputs the hash value to a memory, as continuous valued learning data for binary transformation;

a distance matrix computation unit that computes a distance between data points using a distance function, the distance function being defined as such a one in which, as long as a distance between data points is less than or equal to a preset distance parameter, the value of the distance function preserves the distance, while the value of the distance function decreases if the distance between the data points exceeds the distance parameter;

a cost computation unit that computes a cost value using a cost function defined based at least on the distance of the data points computed by the distance matrix computation unit and on a distance of the continuous valued learning data for binary transformation; and a unit that derives one or more parameters of the hash function that minimizes the cost function, as the optimized one or more parameters of the hash function.

In another aspect of the present invention, there is provided a method for transforming data into binary code, comprising:

optimizing one or more parameters of a hash function;

receiving, from a memory, a data set of a plurality of items of data each represented by a data point on a space of a preset number of dimensions; and transforming the data set into a plurality of K-bit-long binary codes, using, as each of K number hash functions that transforms the data into a binary representation based on a value of projection of the data point on a projection vector, a hash function having the one or more parameters optimized, K being a preset positive integer, wherein the method, in optimizing one or more parameters of a hash function, comprises:

finding a hash value using, as the hash function, a continuous valued hash function including, as a variable, the projection of the data point on the projection vector;

outputting the hash value thus found to a memory as continuous valued learning data for binary transformation; and deriving one or more parameter of the hash function that minimizes a cost function defined based at least on a distance of the data points computed using a distance function and on a distance of the continuous valued learning data for binary transformation, as the optimized one or more parameters of the hash function; the distance function being such a one in which, as long as a distance between the data points is less than or equal to a predetermined distance parameter, the value of the function preserves the distance, but in which the value of the function decreases if the distance between the data points exceeds the distance parameter.

In still another aspect of the present invention, there is provided a non-transitory computer-readable recording medium that stores a program for causing a computer to execute the processing comprising:

hash function optimization processing of optimizing one or more parameters of a hash function; and processing of receiving a data set of a plurality of items of data each represented by a data point on a space of a preset number of dimensions from a memory, and transforming the data set into a plurality of K-bit-long binary codes, using, as each of K number hash functions that transforms the data into a binary representation based on a value of projection of the data point on a projection vector, a hash function having the one or more parameters optimized by the hash function parameter optimization processing; K being a preset positive integer; wherein the hash function parameter optimization processing comprises:

finding a hash value using, as the hash function, a continuous valued hash function including, as a variable, the projection of the data point on the projection vector;

outputting the hash value thus found to a memory as continuous valued learning data for binary transformation; and deriving one or more parameter of the hash function that minimizes a cost function defined based at least on a distance of the data points computed using a distance function and on a distance of the continuous valued learning data for binary transformation, as the optimized one or more parameters of the hash function; the distance function being such a one in which, as long as a distance between the data points is less than or equal to a predetermined distance parameter, the value of the function preserves the distance, but in which the value of the function decreases if the distance between the data points exceeds the distance parameter.

In still another aspect of the present invention, there is provided a biometric authentication system, wherein, in an enrollment phase, a random number S is generated for binary data Z transformed by the binary data transformation apparatus from a data set obtained by feature extraction from the biometric information, and wherein an exclusive OR of a code word C, obtained by error correction encoding the random number S by an encoder, and the binary data Z, that is, (Z (+) C), and an output H(S) of a hash function that has input the random number S, are enrolled in a database.

In still another aspect of the present invention, there is provided a biometric authentication system, wherein, in a verification phase, a value C' obtained by exclusive ORing binary data Z' to be authenticated, output from the binary data transformation apparatus, and the (Z (+) C), read from the database, is entered to a decoder so as to be error correction decoded, an output S' of the decoder is entered to a hash function, and it is decided whether or not an output H(S') of the hash function is equal to H(S) enrolled in the database.

In still another aspect of the present invention, there is provided a biometric authentication system, wherein, in the enrollment phase, the encoder uses a linear code as the error correction code, and the hash function is homomorphic. In the verification phase, a second random number S' is generated each time verification is made. A code word C', obtained by error correction coding the second random number S' in a second encoder, is exclusive ORed with the binary data Z' to be authenticated, output from the binary data transformation apparatus, to yield (C' (+) Z'), which is then exclusive ORed with (Z (+) C) read from the database to yield ($Z_i$ (+) $Z'_i$) (+) ($C_i$ (+) $C'_i$)), which is then entered to the second decoder so as to be error correction decoded. It is decided whether or not an exclusive OR (value: H(S') (+) H(S'')) of a hash value H(S''), obtained by entering an output S'' of the second decoder to the hash function, and a hash value H(S'), obtained by entering the second random number S' to the hash function, is equal to H(S) enrolled in the database. The second encoder and the second decoder use a linear code as the error correction code, and the hash function is homomorphic.

According to the present invention, a method, an apparatus, a system and a program for transforming into binary data, based on learning of an entirely novel hash function, are provided, in which transforming accuracy may be improved as a computation amount is suppressed from increasing.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 2 is a diagram illustrating an example of binary representation for a numerical figure.

DETAILED DESCRIPTION

The following describes exemplary embodiments of the present invention. In the following, learning of parameters of a hash function will be initially described. A data set composed of n number data in a D-dimensional space $$X=\{\vec{x}_1, \ldots, \vec{x}_n\} \in R^{D \times n}$$

is transformed by a hash function h( ) into a K-bit-long binary code Y $$Y=\{\vec{y}_1, \ldots, \vec{y}_n\} \in B^{K \times n}$$

In the present exemplary embodiment, a hash function $h_k(\vec{x})$ is defined, using a sigmoid function, which is a continuous function, as shown by the following equation (5):

$$h_k(\vec{x}; \vec{w}_k, \alpha_k) = \frac{2}{1+\exp\{-\beta(t)(\vec{w}_k^T \vec{x} - \alpha_k)\}} - 1 \quad (5)$$

where k=1, . . . , K.

Also, in the equation (5), β(t) is a control parameter, $\vec{w}_k$ is a projection vector (absolute value $|\vec{w}_k|$=1, k=1, . . . , K), T a transpose ($\vec{w}_k^T$ is a transpose vector of $\vec{w}_k$), $\vec{x}$ a D-dimensional data point, $\alpha_k$ a threshold value (offset), $\vec{w}_k^T \vec{x}$ an inner product of the data point $\vec{x}$ and a projection vector $\vec{w}_k$. The inner product is a projection of the data point $\vec{x}$ on $\vec{w}_k$. Note that the sigmoid function is expressed in a form of σ(x)=1/(1+exp(-ax)), x being a variable and a being a gain.

In the equation (5), β(t) is a positive value, and is controlled to be larger with progress of the learning, that is, with increase in the number of times of iterations at the time of optimization as later explained.

Figure 1:
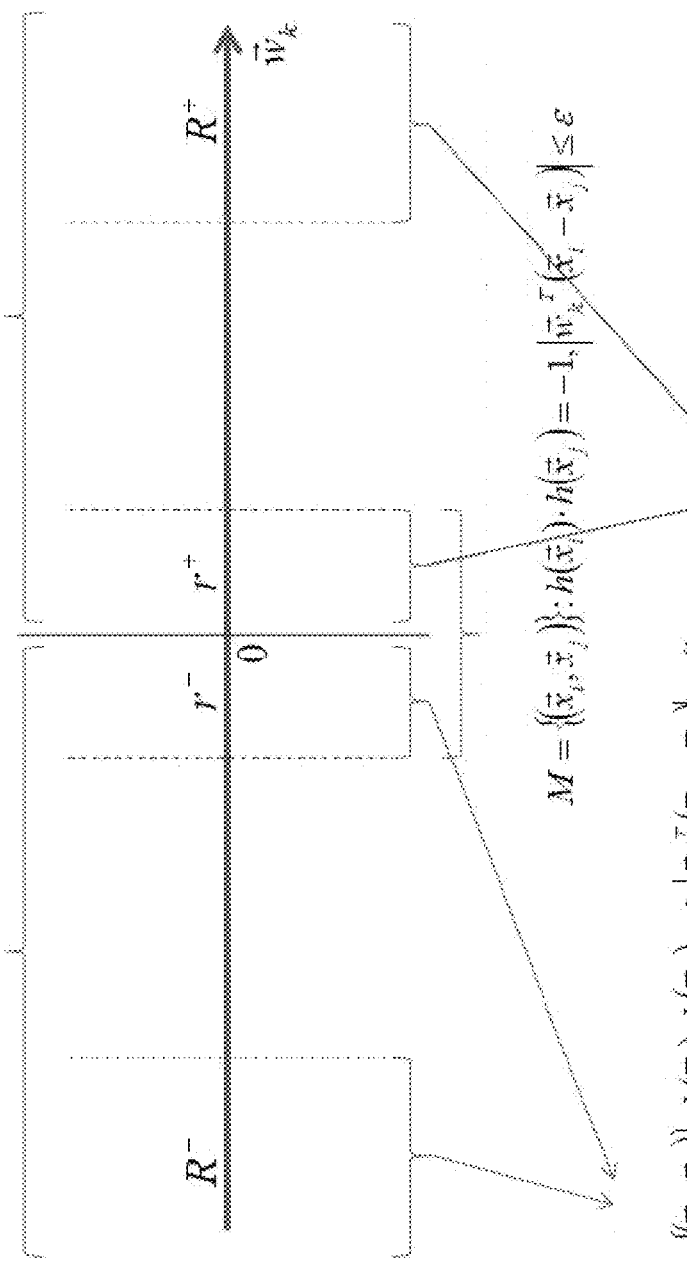
FIG. 1 is a diagram corresponding to FIG. 2 of Non-Patent Literature 4.
Figure 3:
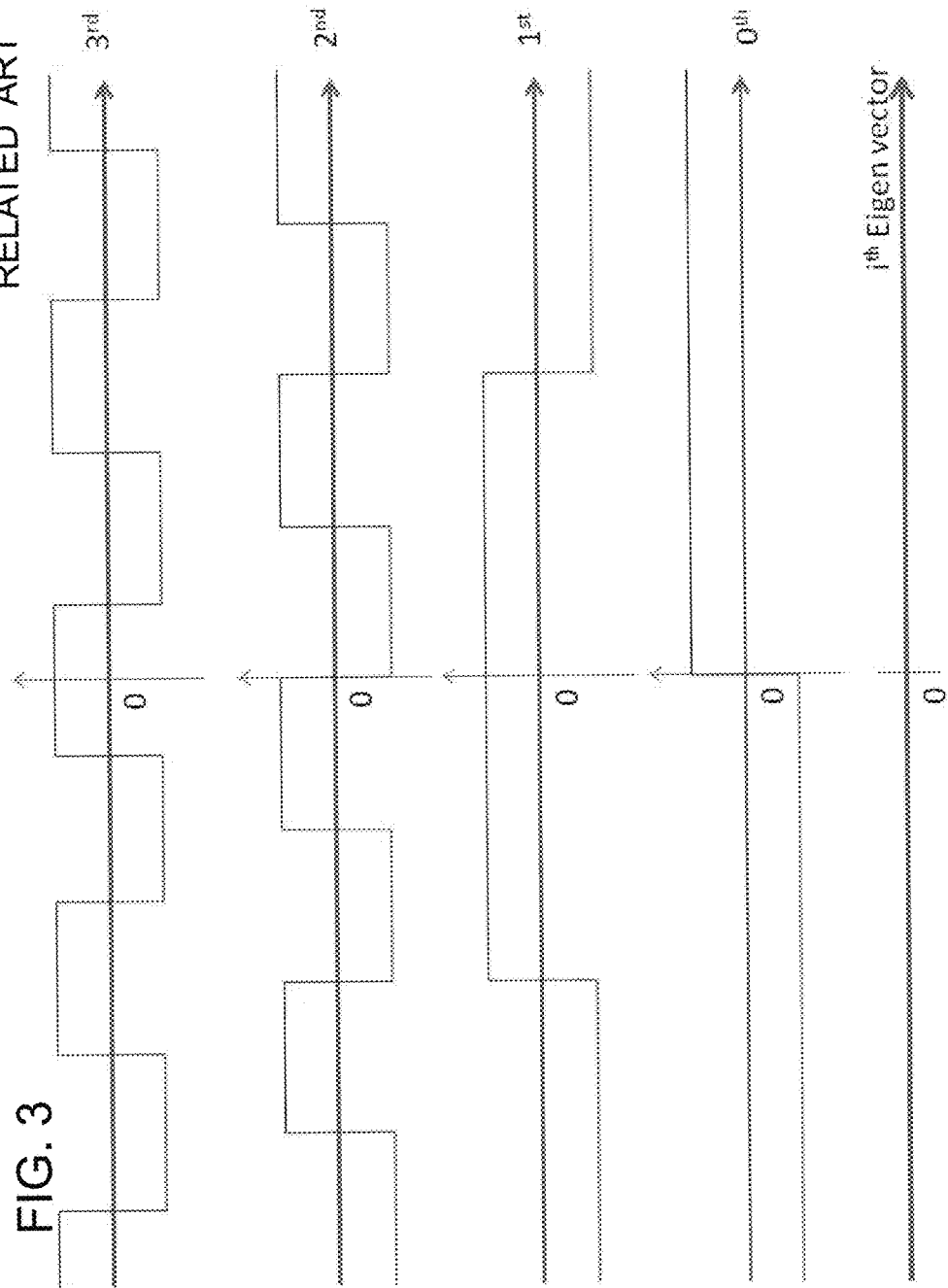
FIG. 3 is a diagram illustrating eigenvectors of spectral hashing.
Figure 4:
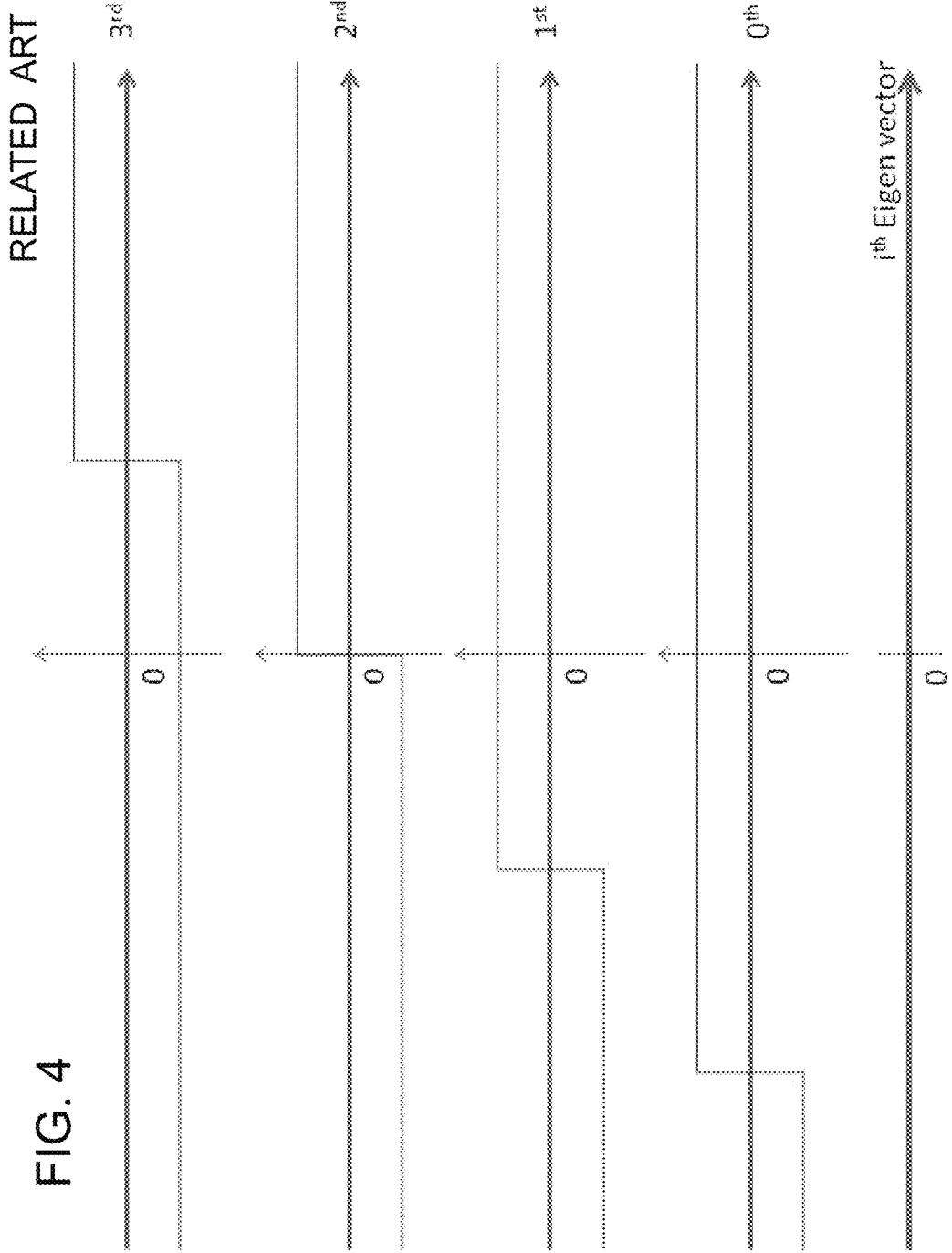
FIG. 4 is a diagram illustrating eigenvectors of an USPLH algorithm.
Figure 5:
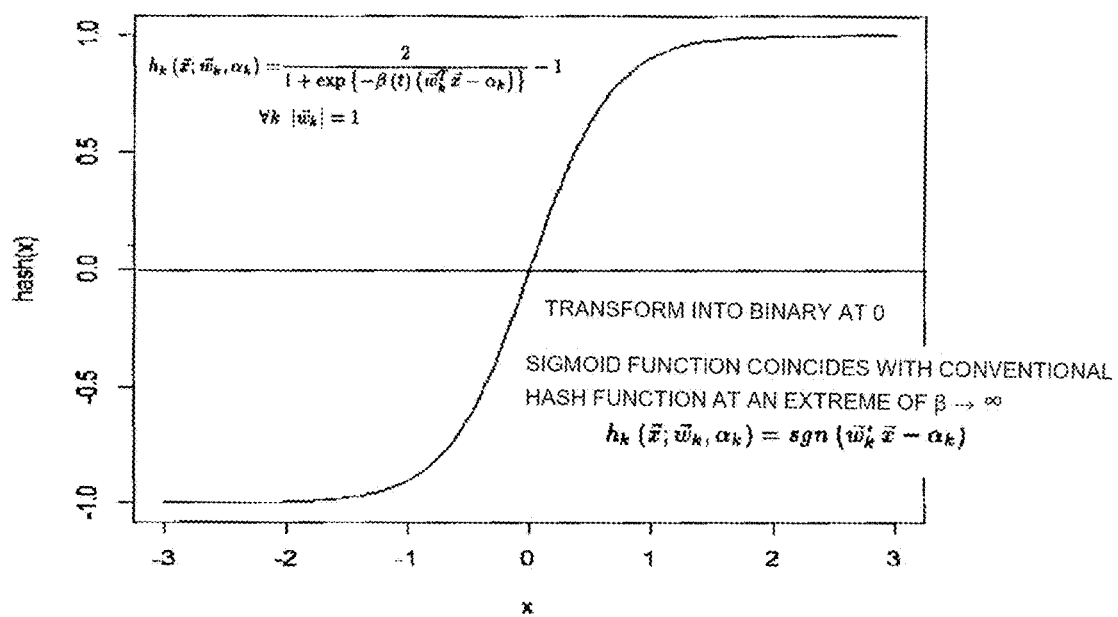
FIG. 5 is a graph illustrating a sigmoid function.

FIG. 5 shows a hash function hash(x) that makes use of the sigmoid function of equation (5). In FIG. 5, x on the abscissa denotes $\vec{w}_k^T \vec{x} - \alpha_k$ and the ordinate a value of the sigmoid function.

The hash function hash(x) of FIG. 5 (sigmoid function) is equal to −1 or +1 at an extreme of β→∞ and coincides with the equation (6). When the learning of parameters of the hash function is completed and optimum parameters $\vec{w}_k$ and $\alpha_k$ are obtained, a binary hash value is obtained using the hash function (binarization function) of the equation 6.

$$h_k(\vec{x}; \vec{w}_k, \alpha_k) = \text{sgn}(\vec{w}_k^T \vec{x} - \alpha_k) \quad (6)$$

Comparing the equations (3) and (6), it is seen that, from $$h_k(\vec{x}) = \text{sgn}(f(\vec{w}_k^T \vec{x} + b_k)) = \text{sgn}(\vec{w}_k^T \vec{x} - \alpha_k)$$

the equation (6) is equivalent to the equation (3) in which the transform function f( ) is an identity mapping (f(x)=x) and $b_k$ of equation (3) is $-\alpha_k$.

On the other hand, in an n×n distance matrix D, representing the distance between data points in the D-dimensional feature space, an i'th-row and j'th-column element $d_{ij}$ is defined by the following equation (7):

$$d_{i,j} = \exp\left(-\frac{|\vec{x}_i - \vec{x}_j|^2}{\varepsilon^2}\right) \quad (7)$$

Figure 6:
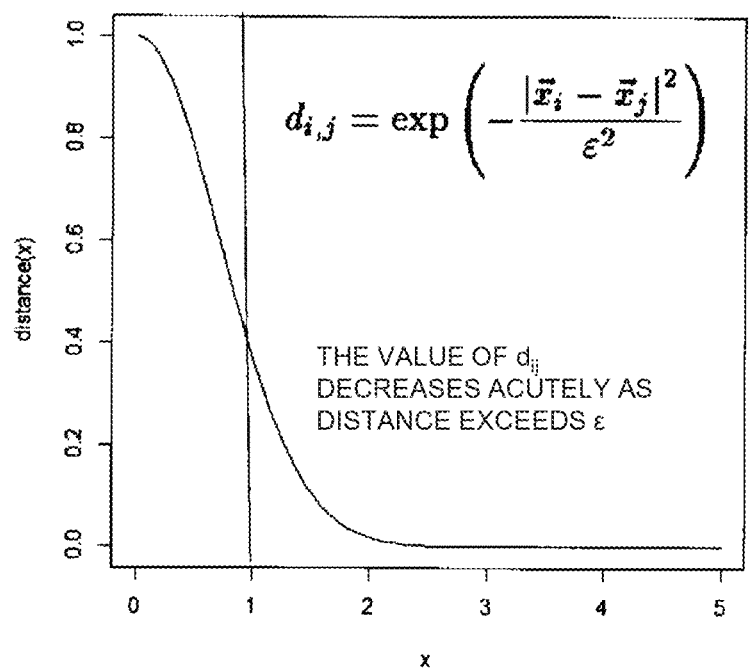
FIG. 6 is a graph illustrating a distance function.

In the equation (7), ε is a positive constant which is a value that pre-defines the neighbor in the feature space (distance parameter). FIG. 6 is a graph illustrating the element $d_{ij}$ of the distance matrix of the equation (7). In FIG. 6, the horizontal axis x denotes a distance between data point pairs $|\vec{x}_i - \vec{x}_j|$ of the equation (7) and the ordinate $d_{ij}$. As may be seen from FIG. 6, when $|\vec{x}_i - \vec{x}_j|$=0, $d_{ij}$=1 and, when $|\vec{x}_i - \vec{x}_j|$=ε, x on the vertical axis is 1 and $d_{ij}$=1/e=1/

2.71828 . . . . Moreover, when $|\vec{x}_i - \vec{x}_j| > \epsilon$, $d_{ij}$ becomes rapidly smaller, that is, decreases exponentially.

Figure 7B:
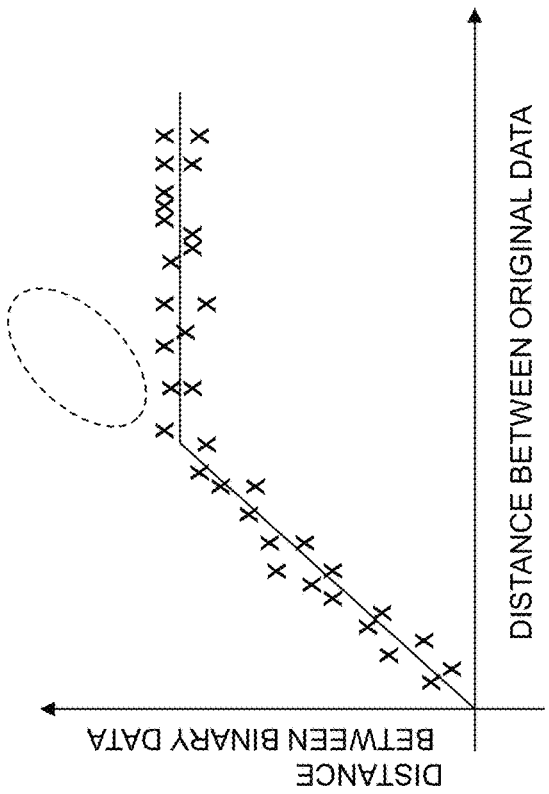
FIGS. 7A and 7B are graphs showing the relationship between the neighbor and the distance function.
Figure 7A:
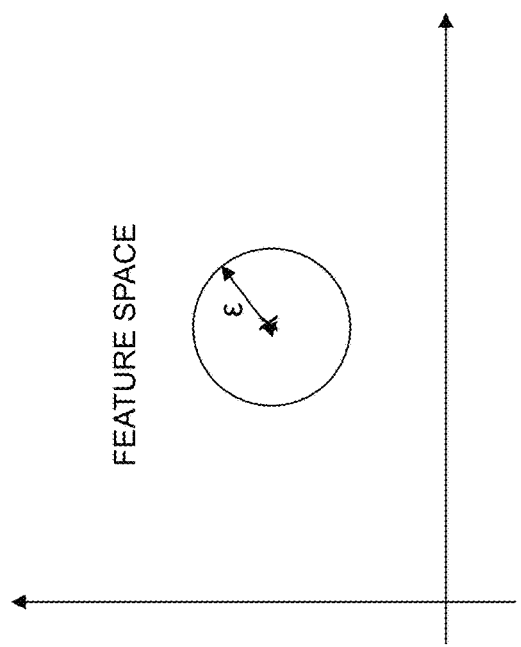

FIG. 7A and FIG. B illustrate a concept of neighborhood in the feature space ($R^{D \times n}$). A distance is preserved if it is within the neighborhood of a radius $\epsilon$ about a given point as center, but is not so outside radius $\epsilon$, that is, outside the neighborhood. That is, in transforming into a binary value, as in binary hashing, such bit expression that is able to approximate any distance value is not necessarily desirable. In other words, it is true that a distance in the neighborhood is crucial in, for example, discrimination between self and anyone else. However, if the distance from a location (query point) is sufficiently larger than a threshold value, a larger value of the approximation error does not matter. The distance $d_{ij}$ becoming rapidly (exponentially) smaller for $|\vec{x}_i - \vec{x}_j| > \epsilon$ is equivalent to discounting the distance between two spaced apart data points in learning. On the other hand, if $d_{ij}$ is sufficiently small, it may be set to zero to dispense with computation to reduce the learning time.

It is necessary for the binary data Y to approximate a matrix D representing the distance between data elements of an original data set X, that is, the data set which is yet to be transformed into binary data. Therefore, as the task of optimization, parameters $\vec{w}_k$ and $\alpha_k$ in a hash function $$h_k(\vec{x}; \vec{w}_k, \alpha_k)$$

as defined by the sigmoid function of the equation (5) are learned as coefficients (parameters) of a hash function that minimize the value of the cost function (objective function) $S(W, \vec{\alpha})$ given by the following equation (8):

$$S(W, \vec{\alpha}) = \frac{1}{4} \sum_{i,j=1}^{n} d_{i,j} |\vec{y}_i - \vec{y}_j|^2 \quad (8)$$

as a task for optimization.

In the above equation (8), W and $\vec{\alpha}$ are given by the following equations (9), (10):

$$W = \{\vec{w}_1, \ldots, \vec{w}_n\} \quad (9)$$

$$\vec{\alpha} = (\alpha_1, \ldots, \alpha_K)^T \quad (10)$$

In the equation (8), $$\sum_{i,j=1}^{n} d_{i,j} |\vec{y}_i - \vec{y}_j|^2$$

is a term relating to distance approximation, and $d_{ij}$ denotes the element (i, j) of the distance matrix D, that is, a distance between the i'th data point and the j'th data point. $|\vec{y}_i - \vec{y}_j|$ is a distance of learning data for binary transformation obtained from the hash values. The binary codes $y_i$, and $y_j$, obtained by transforming the original data set using the hash function, are compared with each other by XOR (Exclusive OR). However, in the present exemplary embodiment, the term is expressed in a quadratic form which is ready to process mathematically and which will give the same result as XOR insofar as the binary code is concerned.

In learning the coefficients (parameters) of the hash function, the steepest descent method is used in order to find the least value of the cost function S, though not in a limiting way. An optimum value of each of the parameters $\vec{w}_k$ and $\alpha_k$ of the hash function (sigmoid function), that is, $$\vec{w}_k$$

and $$\hat{\alpha}_k$$

where a hat mark denotes an optimum value, may be found by minimizing the cost function S using the most steepest descent method.

That is, in learning the parameters of the hash function, that is, at the time of parameter optimization, that is, the function for transforming into the binary representations (binary values) is replaced by the sigmoid function of FIG. 5, which takes on a continuous value. This renders it possible to apply the optimizing method including the steepest descent method to carry out parameter learning. Though not limited thereto, the value of $\beta(t)$ is increased with increase in the number of times of learning t in order to cause the sigmoid function to approach to the function for transforming into binary values.

Note that parameters $\vec{w}_k$ and $\alpha_k$ at the time of the t'th update are denoted as $$\vec{w}_k^{(t)}$$

and $$\alpha_k^{(t)}.$$

The parameters for a (t+1)st update, that is, $$\vec{w}_k^{(t+1)}$$

and $$\alpha_k^{(t+1)}$$

where k=1, 2, . . . , n, are updated by the parameter values for the t'th iteration, that is, $$\vec{w}_k^{(t)}$$

and $$\alpha_k^{(t)}$$

and by the gradient of the cost function S (partial differentiation coefficients of S with respect to $\vec{w}^{(t)}_k$ and $\alpha^{(t)}_k$), that is, $$\left[\frac{\partial S(W, \vec{\alpha})}{\partial \vec{w}_k}\right]_{W=W^{(t)}, \vec{\alpha}=\vec{\alpha}^{(t)}} \text{ and } \left[\frac{\partial S(W, \vec{\alpha})}{\partial \alpha_k}\right]_{W=W^{(t)}, \vec{\alpha}=\vec{\alpha}^{(t)}}$$

in accordance with the following equations (11) and (12).

$$\vec{w}_k^{(t+1)} = \vec{w}_k^{(t)} - \gamma(t) \left[\frac{\partial S(W, \vec{\alpha})}{\partial \vec{w}_k}\right]_{W=W^{(t)}, \vec{\alpha}=\vec{\alpha}^{(t)}} \quad (11)$$

$$\alpha_k^{(t+1)} = \alpha_k^{(t)} - \gamma(t) \left[\frac{\partial S(W, \vec{\alpha})}{\partial \alpha_k}\right]_{W=W^{(t)}, \vec{\alpha}=\vec{\alpha}^{(t)}} \quad (12)$$

Note that $\gamma(t)$ is a preset positive constant or is controlled so that its value will decrease for each number of times of iteration ($\gamma(t+1) < \gamma(t)$).

In the equation (11), the term of partial differentiation may be expressed by the following equation (13):

$$\left[\frac{\partial S(W, \vec{\alpha})}{\partial \vec{w}_k}\right]_{W=W^{(t)}, \vec{\alpha}=\vec{\alpha}^{(t)}} = \quad (13)$$

$$2\sum_{i,j=1}^{n} d_{i,j}(y_{i,k} - y_{j,k}) \left\{ \left[\frac{\partial y_{i,k}(\vec{w}_k, \alpha_k)}{\partial \vec{w}_k}\right]_{W=W^{(t)}, \vec{\alpha}=\vec{\alpha}^{(t)}} - \left[\frac{\partial y_{j,k}(\vec{w}_k, \alpha_k)}{\partial \vec{w}_k}\right]_{W=W^{(t)}, \vec{\alpha}=\vec{\alpha}^{(t)}} \right\} =$$

$$4\sum_{i=1}^{n-1}\sum_{j=i+1}^{n} d_{i,j}(y_{i,k} - y_{j,k}) \left\{ \left[\frac{\partial y_{i,k}(\vec{w}_k, \alpha_k)}{\partial \vec{w}_k}\right]_{W=W^{(t)}, \vec{\alpha}=\vec{\alpha}^{(t)}} - \left[\frac{\partial y_{j,k}(\vec{w}_k, \alpha_k)}{\partial \vec{w}_k}\right]_{W=W^{(t)}, \vec{\alpha}=\vec{\alpha}^{(t)}} \right\} \text{ where}$$

$$\left[\frac{\partial y_{i,k}(\vec{w}_k, \alpha_k)}{\partial \vec{w}_k}\right]_{W=W^{(t)}, \vec{\alpha}=\vec{\alpha}^{(t)}} = \frac{2\beta(t)\exp\{-\beta(t)(\vec{w}_k^{(t)}\vec{x}_i - \alpha_k^{(t)})\}}{\left(1 + \exp\{-\beta(t)(\vec{w}_k^{(t)}\vec{x}_i - \alpha_k^{(t)})\}\right)^2} \cdot \vec{x}_i \quad (14)$$

In the equation (12), the term of partial differentiation may be expressed by the following equation:

$$\left[\frac{\partial S(W, \vec{\alpha})}{\partial \alpha_k}\right]_{W=W^{(t)}, \vec{\alpha}=\vec{\alpha}^{(t)}} = \quad (15)$$

$$2\sum_{i,j=1}^{n} (d_{i,j} - \lambda)(y_{i,k} - y_{j,k}) \left\{ \left[\frac{\partial y_{i,k}(\vec{w}_k, \alpha_k)}{\partial \alpha_k}\right]_{W=W^{(t)}, \vec{\alpha}=\vec{\alpha}^{(t)}} - \left[\frac{\partial y_{j,k}(\vec{w}_k, \alpha_k)}{\partial \alpha_k}\right]_{W=W^{(t)}, \vec{\alpha}=\vec{\alpha}^{(t)}} \right\} =$$

$$4\sum_{i=1}^{n-1}\sum_{j=i+1}^{n} (d_{i,j} - \lambda)(y_{i,k} - y_{j,k}) \left\{ \left[\frac{\partial y_{i,k}(\vec{w}_k, \alpha_k)}{\partial \alpha_k}\right]_{W=W^{(t)}, \vec{\alpha}=\vec{\alpha}^{(t)}} - \left[\frac{\partial y_{j,k}(\vec{w}_k, \alpha_k)}{\partial \alpha_k}\right]_{W=W^{(t)}, \vec{\alpha}=\vec{\alpha}^{(t)}} \right\} \text{ where}$$

$$\left[\frac{\partial y_{i,k}(\vec{w}_k, \alpha_k)}{\partial \alpha_k}\right]_{W=W^{(t)}, \vec{\alpha}=\vec{\alpha}^{(t)}} = \frac{2\beta(t)\exp\{-\beta(t)(\vec{w}_k^{(t)}\vec{x}_i - \alpha_k^{(t)})\}}{\left(1 + \exp\{-\beta(t)(\vec{w}_k^{(t)}\vec{x}_i - \alpha_k^{(t)})\}\right)^2_i} \quad (16)$$

If the absolute value of a difference $S^{(t+1)}(W, \vec{\alpha}) - S^{(t)}(W, \vec{\alpha})$ between the cost function $S^{(t+1)}(W, \vec{\alpha})$ of the equation (8) obtained by the (t+1)st iteration and the cost function $S^{(t)}(W, \vec{\alpha})$ of the equation (8) obtained by the t'th iteration is not larger than a convergence decision parameter δ, that is, if $$|S^{(t+1)}(W, \vec{\alpha}) - S^{(t)}(W, \vec{\alpha})| < \delta$$

the cost function $S(W, \vec{\alpha})$ is decided to have converged, that is, assumed the least value. The parameters $W^{(t+1)}$, and $\vec{\alpha}^{(t+1)}$ at this time are output from a coefficient output unit 112 as parameters of the hash function (sigmoid function of the equation (5)), that is, as optimum parameters $$\hat{\vec{w}}_k$$

and $$\hat{\alpha}_k.$$

The learning data containing n number D-dimensional data points (data set) are transformed into binary at a transverse axis x=0 in FIG. 5, using the optimum parameters of the hash function $\hat{W}^{(t+1)}$ and $\hat{\vec{\alpha}}^{(t+1)}$ of the hash function and $\hat{\beta}^{(t+1)}$ as parameters of the sigmoid function of the equation (5) to yield K-bit-long n number binary hash codes $Y \in B^{K \times n}$ as the binary codes desired to be found. The learning data may also be transformed into binary data, by way of binary hashing, by substituting the optimized parameters $\hat{W}^{(t+1)}$, and $\hat{\vec{\alpha}}^{(t+1)}$ obtained into $\vec{w}_k$ and $\alpha_k$ of the hash function $h_k(\vec{x}; \vec{W}, \alpha_k)$ of the equation (6) where $\beta^{(t+1)} \to \infty$ in FIG. 5. These binary codes are used e.g., in approximate nearest neighbor search processing.

As described above, it is possible to improve the accuracy, for example, to implement such binary codes having near or nearest neighbors similar to those in the original space, as the computation amount is suppressed from increasing. This is made possible by implementing a novel learning method that consists in employing a sigmoid function expressed in a continuous value as a hash function and in finding optimum parameters of the hash function by minimizing the cost function. This cost function is defined based on a distance matrix $d_{ij}$ and on a distance between binary learning data $y_i$, and $y_j$ obtained using, as the hash function, the sigmoid function which is a continuous function. With the distance of the original data space (Euclidean space) labeled d, the distance matrix $d_{ij}$ is found using a distance function having such characteristic that the value of the function preserves the distance in the near or nearest neighbor but does not preserve the distance otherwise, or that a distance larger than a predetermined value is maintained at substantially a constant value.

It is noted that, if, in the equation (8), $\vec{y}_i$ and $\vec{y}_j$ are equal to each other, the portion of the equation enclosed within ‖ is equal to zero. Thus, if, in the course of the learning, $\vec{y}_i$ and $\vec{y}_j$ are equal to each other, the cost function $S(W, \vec{\alpha})$ becomes smaller. In short, such a situation may arise in which learning is done in a mistaken manner such that $\vec{y}_i$ and $\vec{y}_j$ will become equal to each other. To prevent such situation from arising, a penalty term(s) may be donated to the equation (8). For example, such a cost function shown by the following equation (17):

$$S(W, \vec{\alpha}) = \frac{1}{4}\sum_{i,j=1}^{n} d_{i,j}|\vec{y}_i - \vec{y}_j|^2 - \lambda \sum_{i=1}^{n}\left|\vec{y}_i - \sum_{j=1}^{n}\vec{y}_j\right|^2 \quad (17)$$

including penalty terms may be used. The penalty terms penalize non-variations of $\vec{y}_i$. In the above equation, λ denotes a positive constant.

In the case wherein the equation (17) is used as the cost function, learning of the coefficients of the hash function, which will minimize the cost function, is performed in the same way as when the equation (8) is used as the cost function.

Figure 8:
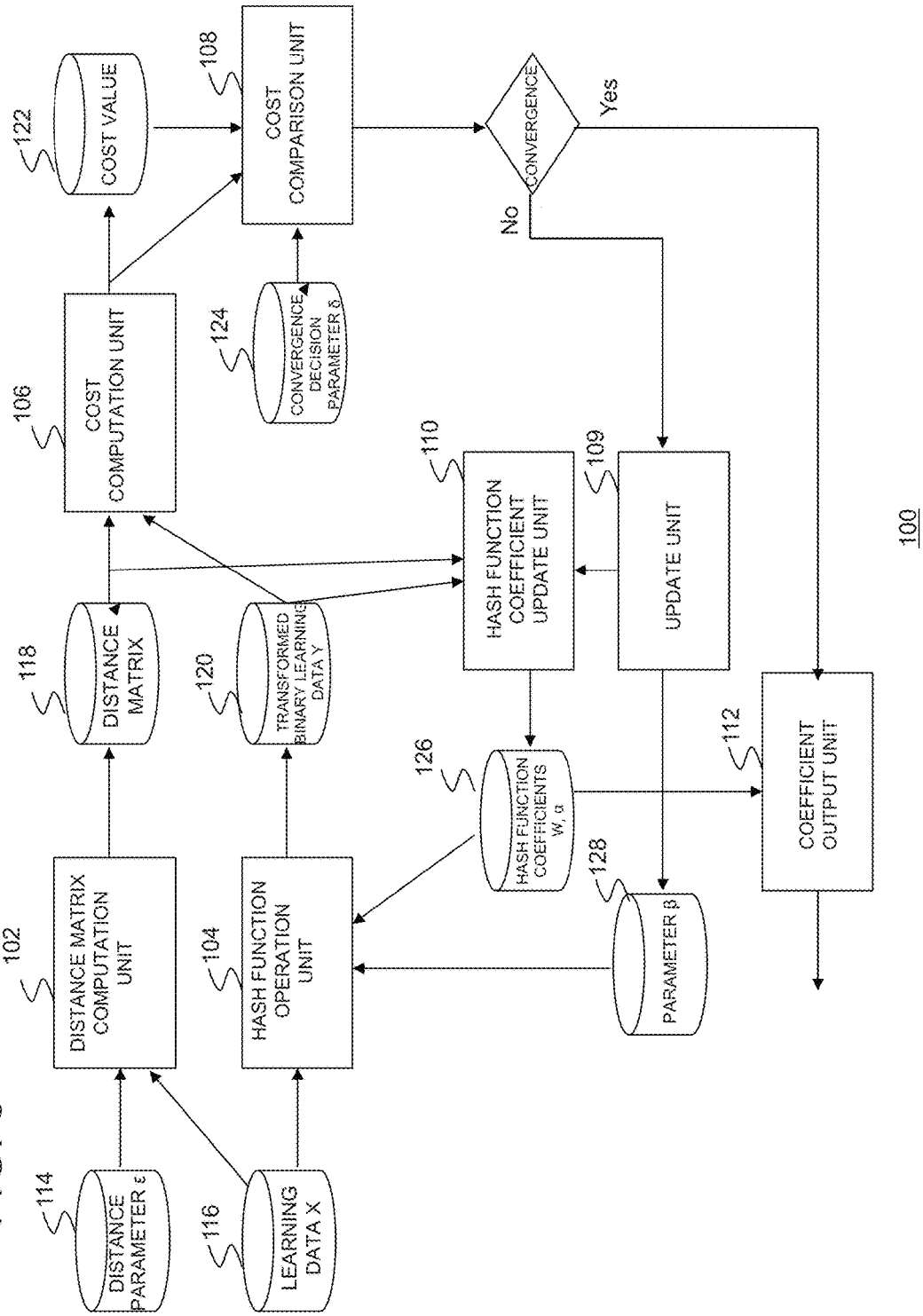
FIG. 8 is a block diagram illustrating an arrangement of an exemplary embodiment.

FIG. 8 is a block diagram illustrating an arrangement of an exemplary embodiment of the present invention. In FIG. 8, there is shown, in an apparatus 100 (binary code transformation apparatus) of the present exemplary embodiment, a portion of the apparatus that optimizes parameter(s) of the hash function (hash function parameter optimizing unit (or means)). The apparatus receives a data set including a plurality (n number) of D-dimensional data points (D is a preset positive integer), and transforms it into a plurality (n number) of items of K-bit-long binary data by K number hash functions which perform binary coding of the data points based on projection values of the data points on a projection vector (K is a preset integer). The apparatus includes a distance matrix computation unit 102, a hash function operation unit 104, a cost computation unit 106, a cost comparison unit 108, an update unit 109, a hash function coefficient update unit 110, and a coefficient output unit 112, a memory 114 to store a distance parameter $\in$, a memory 116 to store learning data, a memory 118 to store the distance matrix, a memory 120 to store learning data for binary transformation, a memory 122 to store a cost value, and a memory 124 to store a convergence decision parameter δ, a memory 126 to store hash function coefficients W, α, and a memory 128 to store a parameter β. The memories 114, 116, 118, 120, 122, 124, 126 and 128 shown may be any of magnetic, optical or semiconductor memories. These memories may be distinct storage areas in one and identical storage apparatus. The memories 114, 124 and 128, respectively storing the parameters ε, δ and β, may be latch circuits or registers. The learning data stored in the memory 116 is comprised of a data set ready to be transformed into binary codes (binary data) and consists of features acquired by feature extraction from e.g., biometric information.

The distance matrix computation unit 102, hash function operation unit 104, cost computation unit 106, cost comparison unit 108, update unit 109, hash function coefficient update unit 110 and the coefficient output unit 112 may have their processing and functions implemented by a program adapted for running on a computer. The present exemplary embodiment also provides a medium, such as a semiconductor memory as well as a magnetic/optical medium or device, in which the program has been recorded and from which the program may be read out by a computer.

Figure 9:
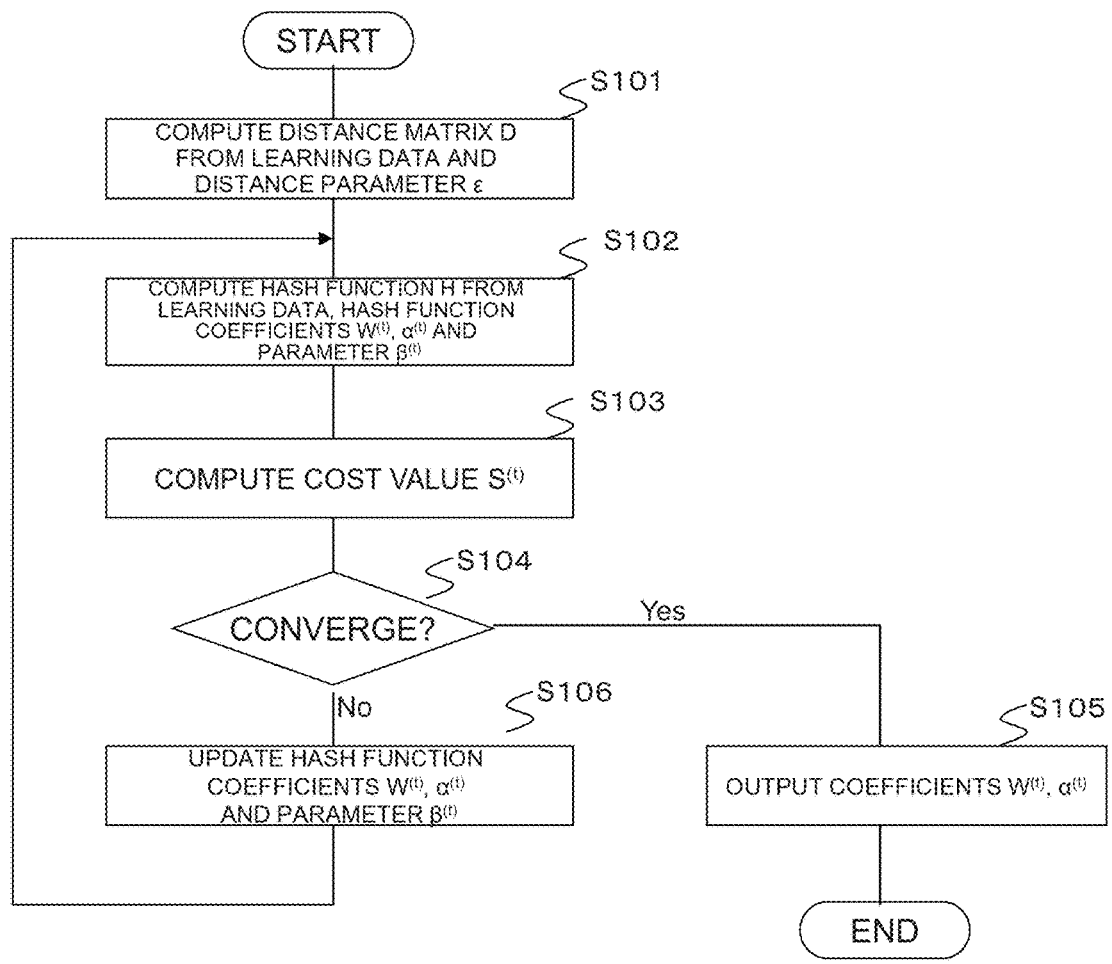
FIG. 9 is a flowchart showing an example of the processing procedure of the exemplary embodiment.

FIG. 9 illustrates a processing procedure of the present exemplary embodiment of the present invention. Referring to FIGS. 8 and 9, the processing procedure for optimizing parameters of the hash function according to the present exemplary embodiment will now be described.

Step 1 (S101 of FIG. 9).

The distance matrix computation unit 102 receives n number learning data in the D-dimensional space $$X = \{\vec{x}_1, \ldots, \vec{x}_n\} \in R^{D \times n}$$

from the memory 116, while receiving the distance parameter $\in$ from the memory 114 and computing the distance $d_{ij}$ between two data points in accordance with the equation (7) to output an n×n distance matrix D to the memory 118.

Step 2 (S102 of FIG. 9)

The hash function operation unit 104 receives the n number data points in the D-dimensional space $$X = \{\vec{x}_1, \ldots, \vec{x}_n\} \in R^{D \times n}$$

from the memory 116, while receiving coefficients (parameters) of the sigmoid function of the equation (5)

$$W^{(t)} = \{\vec{w}_1^{(t)}, \vec{w}_2^{(t)}, \ldots, \vec{w}_K^{(t)}\}$$

and $$\vec{\alpha}^{(t)} = \{\alpha_1^{(t)}, \alpha_2^{(t)}, \ldots, \alpha_K^{(t)}\}^T$$

from the memory 126 and receiving the control parameter β(t) of the sigmoid function from the memory 128. The hash function operation unit 104 computes the value of the hash function $$h_k(\vec{x}; \vec{w}_k, \alpha_k)$$

using the sigmoid function, where k=1, ..., K, in accordance with the above equation (5). The hash function operation unit 104 finds learning data for binary transformation from the hash values of K number hash functions $h_k$ to output $$Y = \{\vec{y}_1, \ldots, \vec{y}_n\} \in B^{K \times n}$$

to the memory 120.

Step 3 (S103 of FIG. 9)

The cost computation unit 106 reads the distance matrix D from the memory 118 and the transformed binary data $Y \in B^{K \times n}$ from the memory 120, and computes the cost function (objective function) of the equation (8) or (17)

$$S^{(t)} = S(W^{(t)}, \vec{\alpha}^{(t)})$$

which is then output to the memory 122 and to the cost comparison unit 108.

Step 4 (S104 of FIG. 9)

The cost comparison unit 108 reads the cost value $S^{(t-1)}$ obtained last time from the memory 122 and the convergence decision parameter δ from the memory 124 to compare the last cost vale to the cost value $S^{(t)}$ from the cost computation unit 106. That is, the cost comparison unit 108 checks to see if the condition for convergence $$|S^{(t)} - S^{(t-1)}| < \delta \quad (18)$$

is met for the cost value $S^{(t)}$ and the previous cost value $S^{(t-1)}$. If the result of the decision indicates that the valid convergence condition of the equation (18) is met, the cost value is converged. If otherwise, the cost value is not converged.

Step 5 (S105 of FIG. 9)

If the cost value is converged (YES in S104), the coefficient output unit 112 outputs $W^{(t)}$ and $\alpha^{(t)}$ (minimizing the cost function comes to a close). At a stage where the optimum values of the parameters of the hash function by minimizing the cost function are found, the hash function operation unit 104 finds the binary representation {−1, +1} of the equation (6) that is to take the place of continuous values between −1 and +1 of the equation (5), as hash values in binary representation, using the optimized parameters. These hash values thus found represent binary data desired to be found.

Step 6 (S106 of FIG. 9)

If conversely the condition for convergence is not met (No of decision in step S104), the update unit 109 updates the parameter β(t) to β(t+1) and instructs the hash function coefficient update unit 110 to update the coefficients (parameters W, and $\vec{\alpha}$). The hash function coefficient update unit 110 computes the parameters $W^{(t+1)}$ and $\alpha^{(t+1)}$ of the hash function by the above mentioned steepest descent method in accordance with the above equations (11), and (12).

Processing reverts to the step 2 (S102 of FIG. 9), where the hash function operation unit 104 receives $W^{(t+1)}$, and $\alpha^{(t+1)}$, computed in the hash function coefficient update unit 110, and β(t+1), updated by the update unit 109, to find a hash value. The learning data for binary transformation is then stored in the memory 120.

As described above, the present exemplary embodiment determines the learning (optimization) of the parameters of the hash function by a definite procedure (exact solution) employing an algorithm based on mathematical expressions.

According to the present exemplary embodiment, a non-linear sigmoid function is used as a hash function and, in addition, a function type in which only the distances for the near or nearest regions are stored as distances of original data elements (distance matrix) is used. The objective function as found on computations of the distances of the transformed binary data corresponding to the elements of the distance matrix is optimized (minimized) to optimize the parameters of the hash function (projection vectors, threshold values and offsets) to acquire the transformed binary data.

Thus, in the present exemplary embodiment, the shortcomings of the related technologies performing data binarization based on zero point thresholding in the linear subspace, may be overcome to improve the accuracy as well as to suppress the computation amount from increasing. The present exemplary embodiment may be applied to any applications including a learning type near or nearest neighbor approximation search, for example data comparison or extraction of similar data in the Web sites or large scale data mining for big data. In the following, an illustrative application to the biometric authentication will be explained as a typical example.

Example 1

Figure 10:
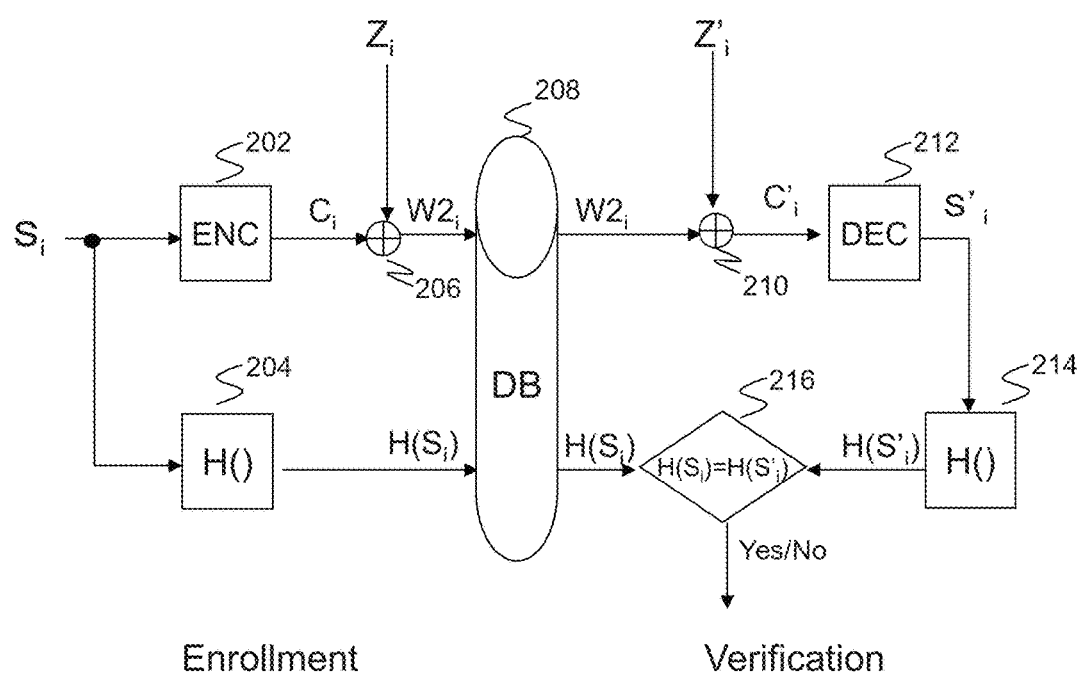
FIG. 10 is a diagrammatic view for illustrating an Example 1.

FIG. 10 is derived from or corresponds to FIG. 2 of Non-Patent Literature 5. Note that a sensor for acquiring the biometric information, such as sensor for acquisition of the fingerprint information, feature extraction of FIG. 2 of the Non-Patent Literature 5, statistical analysis, quantization or selection is dispensed with. In the following, the manner of how a template is enrolled will be described. In the Non-Patent Literature 5, the biometric information Z and the hidden information S are used to produce a template for biometric authentication. Referring to FIG. 9, the biometric information Z is made up of a binary code set $Y \in B^{K \times n}$ obtained by transforming a data set ($X \in R^{D \times n}$) into binary codes in accordance with the present exemplary embodiment. The data set includes n number D-dimensional data points obtained as a result of feature extraction.

(1) The hidden information $S_i$, generated at random from user to user, is delivered to an encoder (ENC) 202 where it is encoded by error correction coding (ECC) to produce a code word $C_i$. For ECC, a two-dimensional BCH code with parameters (K, s, d) is used, where K is a length of a code word, s is the number of information symbols and d is the number of errors that can be corrected.

(2) The code word $C_i$ and the biometric information $Z_i$ are entered to an exclusive OR 206 to compute $$W2_i = C_i (+) Z_i$$

where (+) denotes bitwise exclusive OR (bitwise XOR).

(3) The hidden information $S_i$ is entered to a cryptographic (one-way) hash function 204, such as SHA (Secure Hash Algorithm)-1, so as to obtain a hash value $H(S_i)$.

(4) $W2_i$ and $H(S_i)$ are stored as the template information in a database (DB) 208.

The biometric information $Z_i$ is masked by the code word $C_i$ of high randomness and hence is not leaked from $W2_i$.

The phase of verification to check whether both the template generated by (1) to (4) above and another biometric information $Z'_i$ are derived from one and the same person is carried out as follows:

(1) $Z'_i$ and $W2_i$ are entered to an exclusive OR 210 to compute $C'_i = W2_i (+) Z'_i = C_i (+) (Z_i (+) Z'_i)$. If the biometric information, such as fingerprint, of the enrollment phase and that of the verification phase are derived from one and the same person, the Hamming weight of $(Z_i (+) Z'_i)$ is small, so that error correction is possible.

(2) $C'_i$ is entered to the decoder (DEC) 212 for error correction and decoded by the BCH code to compute $S'_i$.

(3) $S'_i$ is entered to a cryptographic (one-way) hash function 214, such as SHA-1, to compute the hash value $H(S'_i)$.

(4) $H(S_i)$ is read from the database (DB) 208 to check by a decision unit 216 whether or not $H(S_i) = H(S'_i)$ holds. If $H(S_i) = H(S'_i)$ holds, it is determined that the template and the biometric information $Z'_i$ are sampled from one and the same person. If $H(S_i) = H(S'_i)$ fails to hold, it is determined that the template and the biometric information $Z'_i$ are sampled from different persons.

In FIG. 10, the hash value $H(S_i)$ of a random number used for hiding the biometric information Z (hidden information $S_i$) is stored in the database for hiding. The biometric information Z is hidden by XORing it with the data $C_i$ of high randomness which has been obtained by error correction encoding $S_i$. The technique of FIG. 10 may be interpreted as being a system in which whether or not a cypher text has been obtained by encrypting data lying within a preset Hamming distance from the presented data is checked without deciphering the hidden data (encrypted data).

However, the biometric information $Z'_i$ itself is sent to the authentication server in the verification phase. If the authentication is successful, that is, if $H(S_i) = H(S'_i)$ holds, the biometric information $S'_i$, that is, an output of the decoder 212, is also leaked. There is thus a possibility that the biometric information $Z_i$, enrolled in a database, becomes known by the authentication server. Example 2, now explained, shows a technique providing a solution to such problem.

Example 2

Figure 11:
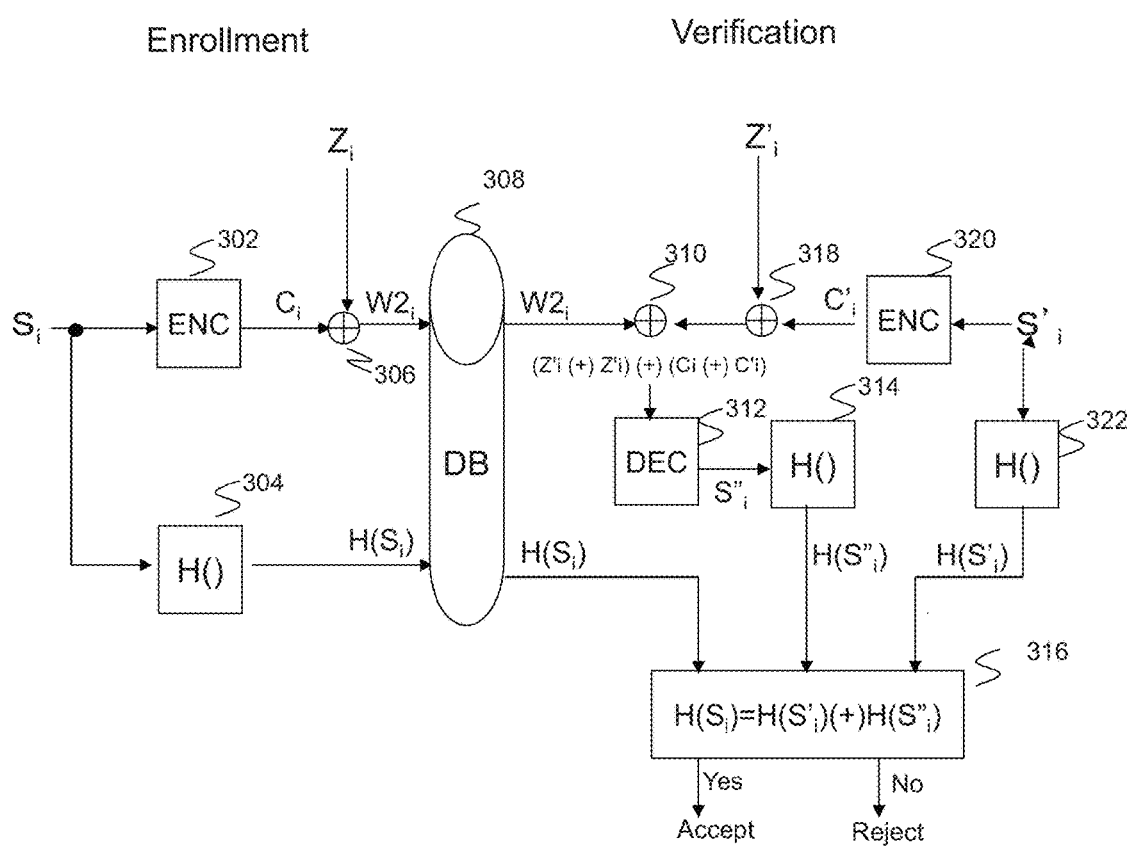
FIG. 11 is a diagrammatic view for illustrating an Example 2.

FIG. 11 illustrated an arrangement of Example 2, which differs from the arrangement of FIG. 10 in that, in the enrollment phase, an encoder 302 which error correction encodes the hidden information Si uses a linear code as the error correction code, while a hash function 304 used is homomorphic. Otherwise, the arrangement of FIG. 11 is the same as that of FIG. 10. It is noted that homomorphicity denotes such property in which mapping f: G→G' satisfies f(a, b)=f(a)·f(b) for ∀ a, b∈G.

For the linear code, an error correction code is used that has such a property that $C_i (+) C'_i$, where $C_i$ is a code word obtained by error correction coding of $S_i$ and $C'_i$ is a code word obtained by error correction coding of $S'_i$, is a code word obtained by error correcting $S_i (+) S'_i$.

On the other hand, a homomorphic hash function is such a hash function in which, for a hash value $H(S_i)$ of $S_i$ and a hash value $H(S'_i)$ of $S'_i$, the relationship of $$H(S_i)(+)H(S'_i) = H(S_i(+)S_i')$$

holds, that is, such a hash function in which $H(S_i) (+) H(S'_i)$ becomes a hash value of $S_i (+) S'_i$.

Referring to FIG. 11, in the verification phase, a code word $C'_i$, obtained by error correction coding in an encoder 320 of a random number (hidden information $S'_i$) generated each time the authentication takes place, is entered, along with the biometric information Z', to be authenticated, to an exclusive OR 318 in order to compute $Z'_i (+) C'i$. An output $(Z'_i (+) C'_{(i)})$ of the exclusive OR 318 and $W2_i$ read from a database (DB) 308 are entered to an exclusive OR 310 in order to compute $$W2_i(+)(Z'_i(+)C'_i) = (Z_i(+)Z'i)(+)(C_i(+)C'_i).$$

An output $(Zi (+) Z'i) (+) (C_i (+) C'_i)$ of the exclusive OR 310 is entered to a decoder (DEC) 312 to perform error correction decoding to output $S''_i$.

An output H(S'$_i$) of a homomorphic hash function 322, supplied with the hidden information S'$_i$, an output H(S"$_i$) of a homomorphic hash function 314, supplied with an output of the decoder (DEC) 312 and H(S$_i$) read from the database (DB) 308, are entered to a decision unit 316 to decide whether or not the relationship $$H(S_i)=H(S'_i)(+)H(S''_i)$$

holds. If the relationship holds, the authentication is accepted and, if otherwise, it is refused.

That is, if the authentication is accepted, $$S_i=S'_i(+)S''_i$$

so that, from the homomorphicity of the hash function, $$(HS_i)=H(S'_i(+)S''_i)=H(S'_i)(+)H(S''_i)$$

holds.

In the arrangement of FIG. 11, the biometric information can not be computed from the information sent from the database 308, in the verification phase, while the information comprised of the biometric information Z'$_i$ masked with the random number is sent to the authentication server, thus assuring safety.

The disclosures of the above mentioned Patent Literature as well as non-Patent Literatures are to be incorporated herein by reference. A wide variety of combinations or selection of elements herein disclosed (elements of claims, Examples and drawings) may be made within the concept of the claims of the present invention. That is, the present invention may include a wide variety of changes or corrections that may occur to those skilled in the art in accordance with the total disclosures inclusive of the claims and the drawings as well as the technical concept of the invention. In particular, it should be understood that any optional numerical figures or sub-ranges contained in the ranges of numerical values set out herein are to be construed to be specifically stated even in the absence of explicit statements.

The invention claimed is:

1. An apparatus for performing binary hashing that transforms a data set composed of a plurality of items of data each represented by a data point on a space of a preset number of dimensions to a Hamming space of binary codes such that near or nearest neighbors on the former space are mapped to similarly near or nearest neighbors on the latter space, the apparatus comprising:
a memory storing instructions; and
at least one processor configured to execute the instructions to perform
a hash function parameter processing that optimizes one or more parameters of a hash function, the hash function parameter optimization processing receiving from a data set memory storing a data set for objects, the data set composed of a plurality of items of data each represented by a data point on a space of a preset number of dimensions and transforming the data set into a plurality of items of K-bit-long binary data, using a hash function having the one or more parameters optimized, as each of K number hash functions that transforms the data into a binary representation, based on a value of projection of the data point on the space of the preset number of dimensions on a projection vector, K being a preset positive integer,
wherein the hash function parameter optimization processing includes:
a hash function operation unit that, using, as the hash function, a continuous valued hash function including, as a variable, a projection of the data point on the projection vector, finds a hash value, and outputs the hash value to a memory, as continuous valued learning data for binary transformation,
wherein the hash function parameter optimization processing derives one or more parameters of the hash function that minimizes a cost function defined based at least on a distance computed using a distance function and on a distance of the continuous valued learning data for binary transformation, as the optimized one or more parameters of the hash function, the distance function being defined as such a one in which, as long as a distance between data points is less than or equal to a preset distance parameter, the value of the distance function preserves the distance, while the value of the distance function decreases if the distance between the data points exceeds the distance parameter.

2. The apparatus according to claim 1, wherein the hash function operation unit optimizes parameters $\vec{w}_k$ and $\alpha_k$, where $\vec{w}_k$ is a projection of the data point on the projection vector, $\vec{\ }$ representing a vector, and $\alpha_k$ is an offset, using, as a k'th (k=1, . . . , K) one of the continuous valued hash functions, a sigmoid function $$\frac{2}{1+\exp\{-\beta(t)(\vec{w}_k^T\vec{x}-\alpha_k)\}}-1$$

where $\beta(t)$ is a control parameter of a positive value,
t is a number of times of iterations of derivation of the parameters in the hash function parameter optimization processing, with $\beta(t)$ increasing with increase in the number of times of iterations,
T denotes transpose,
$\vec{x}$ denotes a data point which is D-dimensional, D being a preset positive integer, and
$\vec{w}_k^T\vec{x}$ denotes a projection of the data point on the projection vector.

3. The apparatus according to claim 1, wherein
a distance matrix computation unit that computes a distance matrix using the distance function, the value of the distance function preserving a distance between data points as long as the distance between the data points is less than or equal to the preset distance parameter, the value of the distance function decreasing exponentially if the distance exceeds the distance parameter,
wherein the hash function parameter optimization processing further includes:
a cost computation unit that computes a cost value using the cost function;
a cost comparison unit that compares the cost value computed this time by the cost computation unit with that computed last time by the cost computation unit to decide whether or not a predetermined convergence condition is satisfied;
a parameter output unit that outputs the one or more parameters of the hash function, as optimized parameters if the convergence condition is satisfied; and
an update unit that updates the one or more parameters of the hash function to store the one or more parameters in a memory if the convergence condition is not satisfied,
wherein the hash function operation unit outputs the learning data for binary transformation using the one or more parameters of the hash function updated by the update unit, if the convergence condition is not satisfied, the cost computation unit computes the cost value, and the cost comparison unit makes a decision on convergence or non-convergence.

4. The apparatus according to claim 3, wherein the distance matrix computation unit finds a distance $d_{ij}$ between an i'th data point and a j'th data point, where i and j are each an integer not less than 1 and not more than n, using the distance function $$d_{i,j} = \exp\left(-\frac{|\vec{x}_i - \vec{x}_j|^2}{\varepsilon^2}\right)$$

where $\varepsilon$ is the distance parameter.

5. The apparatus according to claim 4, wherein the cost function includes $$\sum_{i,j=1}^{n} d_{i,j} |\vec{y}_i - \vec{y}_j|^2$$

that is a sum for an n number of each of i and j of terms, each of the terms corresponding to multiplication of the distance $d_{ij}$ between the i'th point data and the j'th point data with a distance $|\vec{y}_i - \vec{y}_j|$ between the learning data for binary transformation $\vec{y}_i$ and $\vec{y}_j$.

6. The apparatus according to claim 5, wherein the cost function further includes a term $$\lambda \sum_{i=1}^{n} \left|\vec{y}_i - \sum_{j=1}^{n} \vec{y}_j\right|^2$$

where $\lambda$ is a preset positive integer, such that the function is expressed by $$\frac{1}{4}\sum_{i,j=1}^{n} d_{i,j}|\vec{y}_i - \vec{y}_j|^2 - \lambda \sum_{i=1}^{n}\left|\vec{y}_i - \sum_{j=1}^{n} \vec{y}_j\right|^2.$$

7. The apparatus according to claim 2,
wherein the least value of the cost function is found by a steepest descent method, and
wherein when the cost value of the cost function fails to satisfy a convergence condition, the update unit updates the projection vector as well as the offset of the hash function using the current projection vector of the hash function, the offset and a partial differentiation parameter of the cost function with respect to the projection vector and the offset, and updates the control parameter.

8. A biometric authentication system, wherein
in an enrollment phase, the biometric authentication system generates a random number S for binary data Z output from the apparatus as set forth in claim 1, that receives a data set obtained by feature extraction from the biometric information, and
enrolls an exclusive OR of a code word C (Z (+) C), obtained by error correction encoding the random number S by an encoder, and binary data Z, and an output H(S) of a hash function that receives as an input the random number S, in a database.

9. The system according to claim 8,
wherein biometric authentication system includes a decoder that, in a verification phase, receives a value C' obtained by computing an exclusive OR of binary data Z' to be authenticated, output from the binary data transformation apparatus, and the (Z(+)C), read from the database, to perform error correction decoding, an output S' of the decoder being entered to a hash function,
wherein the biometric authentication system decides whether or not an output H(S') of the hash function is equal to H(S) enrolled in the database.

10. The system according to claim 8,
wherein in the enrollment phase, the encoder uses a linear code as the error correction code, and
wherein the hash function is homomorphic.

11. The biometric authentication system according to claim 10,
wherein the biometric authentication system, in the verification phase, generates a second random number S' each time verification is made;
wherein a code word C', obtained by error correction coding the second random number S' in a second encoder, is exclusive ORed with the binary data Z' to be authenticated, output from the binary data transformation apparatus, to yield (C'(+) Z'), which is then exclusive ORed with (Z (+) C) read from the database to yield ($Z_i$ (+) $Z'_i$) (+) ($C_i$ (+) $C'_i$)), which is then entered to the second decoder so as to be error correction decoded;
it is decided whether or not an exclusive OR (value: H(S') (+) H(S'')) of a hash value H(S''), obtained by entering an output S'' of the second decoder to the hash function, and a hash value H(S'), obtained by entering the second random number S' to the hash function, is equal to H(S) enrolled in the database, and
wherein the second encoder and the second decoder use a linear code as the error correction code, the hash function being homomorphic.

12. A method for performing binary hashing by a computer to transform a data set composed of a plurality of items of data each represented by a data point on a space of a preset number of dimensions to a Hamming space of binary codes such that near or nearest neighbors on the former space are mapped to similarly near or nearest neighbors on the latter space, the method comprising:
optimizing one or more parameters of a hash function;
receiving, from a data set memory storing a data set for objects, the data set composed of a plurality of items of data each represented by a data point on a space of a preset number of dimensions; and
transforming the data set into a plurality of K-bit-long binary codes, using, as each of K number hash functions that transforms the data into a binary representation based on a value of projection of the data point on the space of the preset number of dimensions on a projection vector, a hash function having the one or more parameters optimized, K being a preset positive integer,
wherein optimizing one or more parameters of a hash function comprises:

finding a hash value using, as the hash function, a continuous valued hash function including, as a variable, the projection of the data point on the projection vector;

outputting the hash value thus found to a memory as continuous valued learning data for binary transformation; and deriving one or more parameter of the hash function that minimizes a cost function defined based at least on a distance of the data points computed using a distance function and on a distance of the continuous valued learning data for binary transformation, as the optimized one or more parameters of the hash function, the distance function being such a one in which, as long as a distance between the data points is less than or equal to a predetermined distance parameter, the value of the function preserves the distance, but in which the value of the function decreases if the distance between data points exceeds the distance parameter.

13. The method according to claim 12, wherein a sigmoid function $$\frac{2}{1+\exp\{-\beta(t)(\vec{w}_k^T\vec{x}-\alpha_k)\}}-1$$

where $\beta(t)$ is a control parameter of a positive value, t being the number of times of iterations of derivation of the parameters in the hash function parameter optimization step, with $\beta(t)$ increasing with increase in the number of times of iterations;

$\vec{w}_k$ is a projection of the data point on the projection vector (k=1, ..., K);

T is transpose;

$\vec{x}$ denotes a data point which is D-dimensional;

$\vec{w}_k^T\vec{x}$ is a projection of the data point on the projection vector: and $\alpha_k$ is an offset is used as a hash function, which is the continuous function (a k'th one of the hash functions) to optimize the parameters of the hash function $\vec{w}_k$ and $\alpha_k$ (k=1, ..., K).

14. The method according to claim 12, wherein the method comprises:

computing a cost value using the cost function;

comparing the cost value of the cost function computed this time with the cost value of the cost function computed last time to decide whether or not a predetermined convergence condition is satisfied;

outputting the one or more parameters of the hash function as being optimum in case the convergence condition is satisfied;

updating the one or more parameters of the hash function to store the one or more parameters in a memory if the convergence condition is not satisfied; and if the convergence condition is not satisfied, finding the hash value by the one or more parameters of the hash function updated to output binary data;

computing a cost value; and making a decision on convergence/non-convergence.

15. The method according to claim 12, wherein the distance matrix computation unit finds a distance $d_{ij}$ between an i'th data point and a j'th data point, where i and j are each an integer not less than 1 and not more than n, using a distance function $$d_{i,j}=\exp\left(-\frac{|\vec{x}_i-\vec{x}_j|^2}{\varepsilon^2}\right)$$

where $\varepsilon$ is the distance parameter.

16. The method according to claim 15, wherein the cost function includes $$\sum_{i,j=1}^{n}d_{i,j}|\vec{y}_i-\vec{y}_j|^2$$

that is a sum for an n number of each of i and j of terms, each of the terms corresponding to multiplication of the distance $d_{ij}$ between the i'th point data and the j'th point data with a distance $|\vec{y}_i-\vec{y}_j|$ between the learning data for binary transformation $\vec{y}_i$ and $\vec{y}_j$.

17. The method according to claim 16, wherein the cost function further includes a term $$\lambda\sum_{i=1}^{n}\left|\vec{y}_i-\sum_{j=1}^{n}\vec{y}_j\right|^2$$

where $\lambda$ is a preset positive integer such that the function is expressed by $$\frac{1}{4}\sum_{i,j=1}^{n}d_{i,j}|\vec{y}_i-\vec{y}_j|^2-\lambda\sum_{i=1}^{n}\left|\vec{y}_i-\sum_{j=1}^{n}\vec{y}_j\right|^2.$$

18. The method according to claim 13, wherein the method comprises finding the least value of the cost function by a steepest descent method; and when the cost value of the cost function fails to satisfy a convergence condition, updating the projection vector of the hash function as well as the offset, using the current projection vector of the hash function, the offset and a partial differentiation parameter of the cost function with respect to the projection vector and the offset, and updating the control parameter.

19. A non-transitory computer-readable recording medium that stores a program for causing a computer to perform binary hashing processing that transforms a data set composed of a plurality of items of data each represented by a data point on a space of a preset number of dimensions to a Hamming space of binary codes such that near or nearest neighbors on the former space are mapped similarly near or nearest on the latter space, the binary hashing processing comprising:

optimizing one or more parameters of a hash function; and receiving a data set of a plurality of items of data each represented by a data point on a space of a preset number of dimensions from a memory, and transforming the data set into a plurality of K-bit-long binary codes, using, as each of K number hash functions that transforms the data into a binary representation based on a value of projection of the data point on the space of the preset number of dimensions on a projection vector, a hash function having the one or more parameters optimized by the hash function parameter optimization processing; K being a preset positive integer, wherein optimizing one or more parameters of a hash function includes:
  finding a hash value using, as the hash function, a continuous valued hash function including, as a variable, the projection of the data point on the projection vector;
  outputting the hash value thus found to a memory as continuous valued learning data for binary transformation; and
  deriving one or more parameter of the hash function that minimizes a cost function defined based at least on a distance of the data points computed using a distance function and on a distance of the continuous valued learning data for binary transformation, as the optimized one or more parameters of the hash function; the distance function being such a one in which, as long as a distance between the data points is less than or equal to a predetermined distance parameter, the value of the function preserves the distance, but in which the value of the function decreases if the distance between data points exceeds the distance parameter.

20. The transitory computer-readable recording medium according to claim 12, wherein a sigmoid function $$\frac{2}{1+\exp\{-\beta(t)(\vec{w}_k^T \vec{x} - \alpha_k)\}} - 1$$

where $\beta(t)$ is a control parameter of a positive value, t being the number of times of iterations of derivation of the parameters in the hash function parameter optimization step, with $\beta(t)$ increasing with increase in the number of times of iterations;

$\vec{w}_k$ is a projection of the data point on the projection vector (k=1, ..., K);

T is transpose;

$\vec{x}$ denotes a data point which is D-dimensional;

$\vec{w}_k^T \vec{X}$ is a projection of the data point on the projection vector: and $\alpha_k$ is an offset is used as a hash function, which is the continuous functions (a k'th one of the hash functions);

the parameters of the hash function $\vec{w}_k$ and $\alpha_k$ (k=1, ..., K) are optimized.

* * * * *